Patented Apr. 15, 1941

2,238,407

UNITED STATES PATENT OFFICE 2,238,407

HOG FEEDER

Jedah G. Webber, Antwerp, Ohio

Application November 7, 1939, Serial No. 303,281

1 Claim. (Cl. 119—53.5)

This invention is a feeding device for swine. One object of the invention is to provide novel means for raising or lowering the feed drum, thereby to regulate the amount of feed that runs out of the drum, into a trough. Another object of the invention is to provide novel means whereby the feed drum will be noted by the hogs, as they eat out of the trough. A further object of the invention is to provide novel means for keeping the bottom of the feed drum clear of feed when the drum is rotated.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
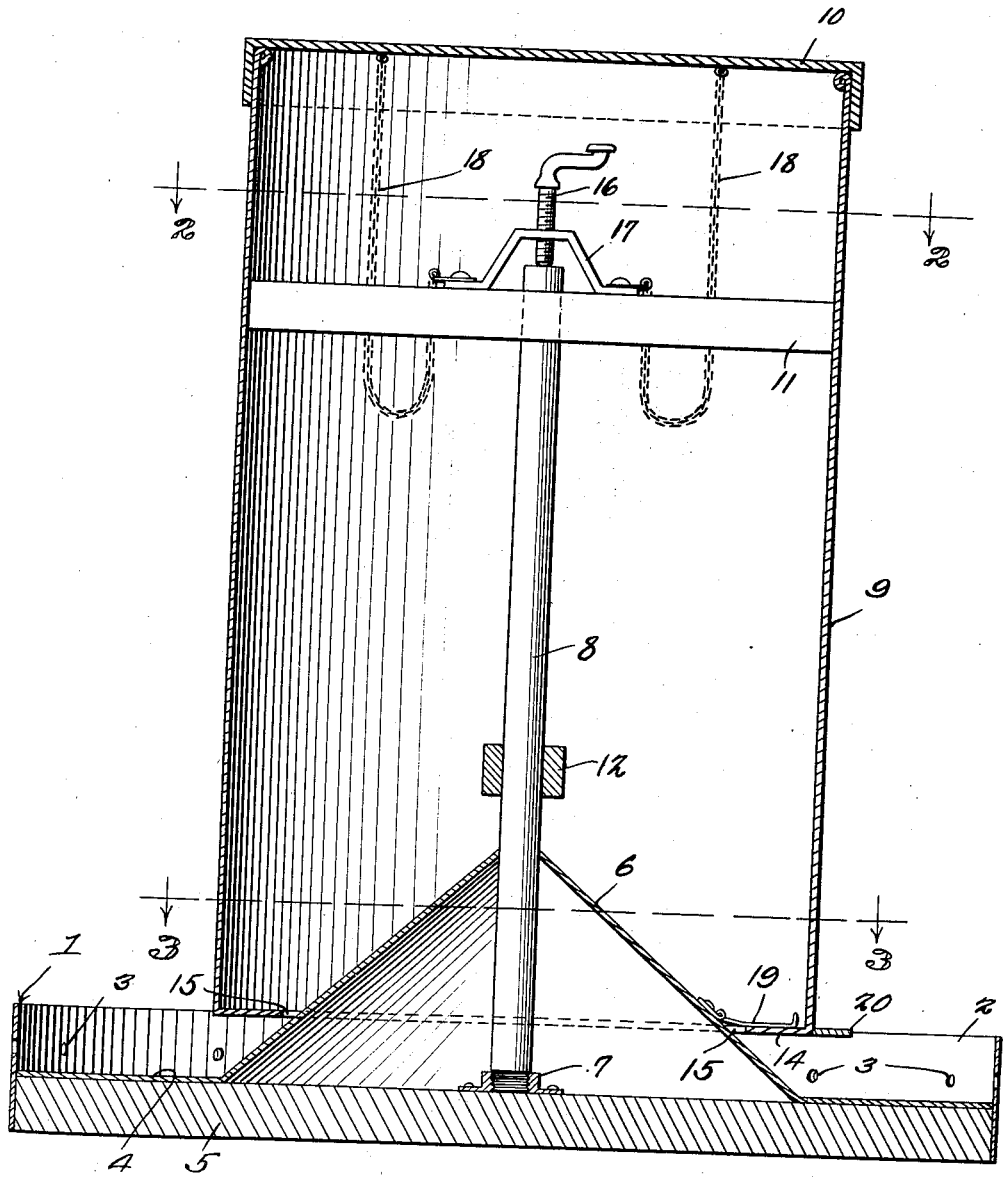
Fig. 1 shows in vertical section, a device constructed in accordance with the invention.
Figure 2:
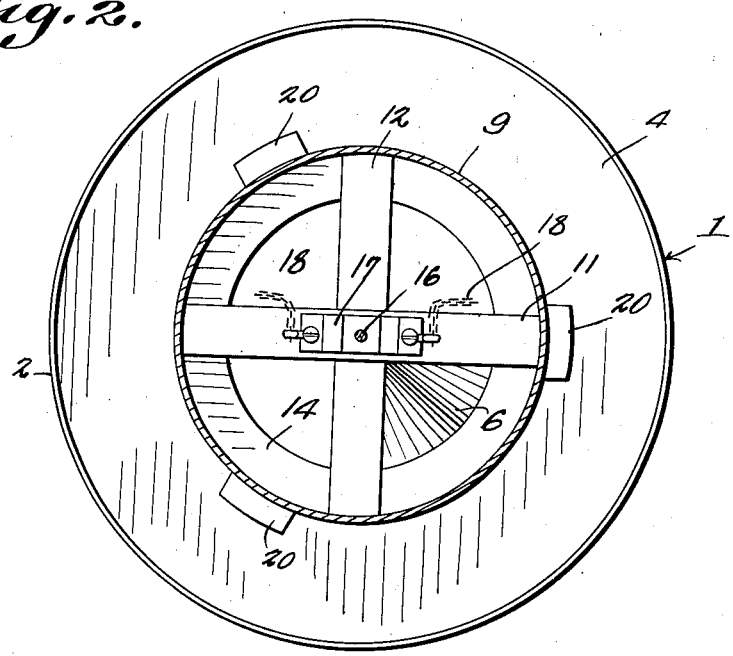
Fig. 2 is a cross section on the line 2—2 of Fig. 1.
Figure 3:
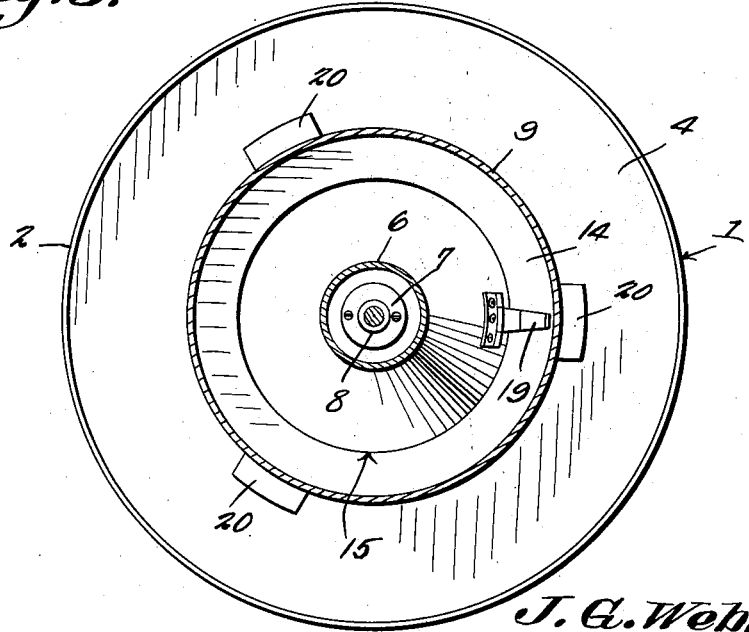
Fig. 3 is a cross section on the line 3—3 of Fig. 1.

The numeral 1 marks an annular feed trough, including a rim 2 having drainage openings 3. To the rim 2 is secured an annular bottom 4, spaced from the lower edge of the rim 2 to accommodate a substantial base 5 which is secured in place. A conical deflector 6 is secured to the inner edge of the bottom 4 of the trough 1. A socket 7 is mounted on the base 5. A post or support 8 is provided and has its lower end threaded into the socket 7, the said support extending upwardly through the apex of the conical deflector 6.

The numeral 9 marks a feed drum, which is surmounted by a removable lid 10. An upper brace 11 and a lower brace 12 are located within the feed drum 9 and have their ends secured thereto. The braces 11 and 12 are arranged at right angles to each other, and the post 8 passes through them. The construction is such that the feed drum 9 can turn readily on the post 8, through the instrumentality of the braces 11 and 12, and the drum can be raised or lowered at the will of an operator. The drum 9 has an inwardly projecting, annular, lower flange 14 disposed about the deflector 6, but separated therefrom to provide an annular space 15. For the raising and lowering of the drum 9, at the will of an operator, an adjusting device 16, such as a screw, is threaded into an arched bracket 17 fastened to the upper brace 11, the screw bearing on the upper end of the post 8. If the operator wishes to have the lid 10 connected to the drum 9, against loss, flexible elements 18 may be connected to the lid and to the bracket 17.

A scraper 19 is hinged to the deflector 6, for vertical movement, and rides on the upper surface of the bottom flange 14 of the feed drum 9. At its lower end, the feed drum 9 is provided with any desired number of outstanding fingers 20, which are rotators, overhanging the trough 1.

The feed to be dispensed is placed in the drum 9. The drum 9 is raised by the screw 16, until the annular space 15, of any desired size, is created. The size of the space 15 regulates the flow of feed from the drum 9 onto the lower part of the deflector 6, and the deflector 6 discharges the feed outwardly into the trough 1. In view of the propensity of swine to root as they feed, the swine, eating out of the trough 1, will engage the rotators 20 and turn the drum 9 about a vertical axis represented by the shaft 8. The rotation of the drum 9 tends to promote the flow of feed from the drum into the trough 1. Moreover, as the drum 9 is rotated, the scraper 19 rides over the upper surface of the lower flange 14 of the drum. The feed, thus, is prevented from banking upon, or adhering to, the flange 14 of the drum and, furthermore, due to the action of the scraper 19, the flow of feed through the opening 15 is enhanced.

The hinged mounting of the scraper 19 not only permits the scraper to ride on the flange 14, but also permits the scraper to be turned upwardly and backwardly against the deflector 6, whilst the drum 9 is being mounted in place.

The device forming the subject matter of this application can be taken down readily for cleaning and it will be found efficient to consummate the ends hereinbefore referred to.

Having thus described the invention, what is claimed is:

An animal feeder including a drum provided adjacent to its lower end with an inwardly projecting flange, a fixed, conical deflector about which the flange extends, to define an annular outlet for the drum, means for supporting the drum rotatably, removably, and for vertical adjustment to alter the size of the outlet, and a feed agitator extended across the outlet, in close relation to the flange, and resting on the flange, the agitator being hinged to the deflector for vertical movement, to maintain its position of rest upon the flange when the drum is adjusted vertically, and to permit the agitator to be swung back against the deflector, to a fixed position out of the way of the removable drum when the drum is lowered to place.

JEDAH G. WEBBER.